Nov. 29, 1966  D. W. BRAMER  3,288,044

SYSTEM FOR TRIGGERING FLASHLAMP

Filed Aug. 5, 1964

INVENTOR.
DONALD W. BRAMER

BY

ATTORNEY

United States Patent Office 3,288,044
Patented Nov. 29, 1966

3,288,044
SYSTEM FOR TRIGGERING FLASHLAMP
Donald W. Bramer, Fairport, N.Y., assignor to Graflex, Inc., Rochester, N.Y., a corporation of Delaware
Filed Aug. 5, 1964, Ser. No. 387,666
8 Claims. (Cl. 95—11.5)

This invention relates to a novel trigger device for generating an electrical pulse such as may be used for triggering an electronic photoflash lamp or the like, and, more particularly, but not exclusively, to an electrical triggering circuit for a so-called "remote" or "slave" operation.

There are many instances in photography where it is desired to use a plurality of flash lamps at different locations, and to have all of the lamps fire substantially simultaneously. This may be done by connecting the trigger terminals of all the lamps in parallel to the shutter contacts of the camera, but such an arrangement is disadvantageous because of the inconvenience of stringing of wires and because the shutter contacts may be overloaded if too many flash tubes are fired simultaneously through them. Moreover, this arrangement is unworkable when distance or other factors make the use of wires impractical. It is, therefore, preferable to fire only one flash tube through the shutter contacts, and to make the other flash units light-responsive so that they flash in response to light received from the one flash tube. Heretofore, photoelectric tubes have been used for firing the other flash units. In order to make the photoelectric tubes work, however, it has been necessary to use some means of amplification in the trigger circuit, such as a thyratron. This provides a more sensitive trigger circuit but makes the circuit complex and expensive.

One important object of the present invention is to provide a novel trigger circuit for flashlamps of relatively inexpensive and simple construction.

Another object of the invention is to provide a novel trigger circuit for generating a high voltage trigger pulse for triggering a flash tube at high speed, which has fully adequate power output, yet uses a minimum number of parts.

Another object of the invention is to provide a novel trigger circuit of this type which may alternatively be used selectively as a trigger amplifier in the circuit to a flashlamp of a camera, or as a self-contained light-responsive triggering device for remote or slave operation of a flashlamp.

A further object is to provide a circuit of this type which is compact and may be conveniently installed within a flash lamp housing, and which is of simple, rugged and durable construction.

Another object of the invention is to provide a selective trigger circuit of the character described, so constructed that the mode of its operation may be selected quickly by a simple switch on the lamphead and which will eliminate need for any photoelectric tube for remote operation.

Still another object of the invention is to provide a circuit of the character described that is insensitive to random noise pulses but which will, however, trigger reliably with resistances as high as one thousand ohms at greatly reduced shutter current as compared to conventional directly triggered circuits.

A still further object of the invention is to provide a solid state electronic triggering circuit of the character described which is not susceptible to dampness and which for remote operation will trigger only upon rapid change in light level, and is not sensitive to ambient light conditions.

The foregoing and other objects and advantages of the invention will become apparent from the following detailed description and from the recital of the appended claims particularly when taken in conjunction with the drawing, which illustrates presently preferred embodiments thereof, and wherein:

Figure 2:
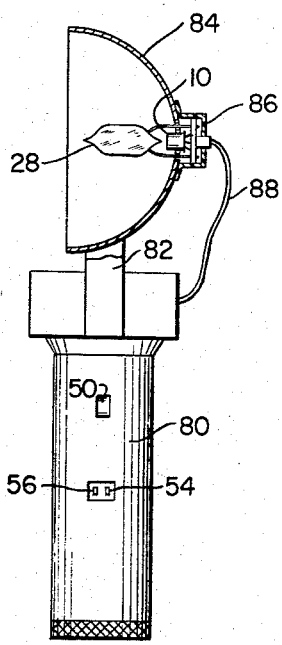
FIG. 2 is a side elevational view, partly in section, of a photoflash lamp constructed according to one embodiment of the invention.

Briefly, the invention contemplates the use of a circuit including a triggerable avalanche discharge device, such as a light-sensitive silicon-controlled rectifier, as a trigger device for controlling the operation of a photoflash tube or of any other device that requires a relatively high voltage pulse to actuate it. In the circuit of the embodiment of the invention described herein, the cathode-anode circuit of the light-sensitive silicon-controlled rectifier (LSCR) is connected in series with the primary winding of a step-up transformer, the output of which is connected to the trigger electrode of a conventional gas-filled flash tube. The LSCR is connected so that it may be fired selectively either responsively to a flash of light such as reflected light received from another flash tube, or only in response to closing of a pair of contacts such as the shutter contacts of a camera.

Referring now to the drawing, 10 denotes the light-sensitive silicon-controlled rectifier, the LSCR.

In the circuit shown, the main storage capacitor 22 is connected across the battery 24, or other source of D.C. electric energy of appropriate voltage, ordinarily about 450 volts, in series with a limiting resistor 26. The flash tube 28 is connected directly in parallel with the main storage capacitor 22. A neon "ready signal" lamp 30 is connected through a voltage reducing network in parallel with the capacitor 22 and flash tube 28. The voltage reducing network includes resistor 32 and variable resistor 33.

The control circuit for the flashlamp 28 includes the LSCR 10, the cathode 34 of which is connected directly to the negative terminal of the battery 24. The anode 36 of the LSCR is connected to the common terminal between the two windings of a step-up transformer 38. An auxiliary storage capacitor 42 is connected to discharge through the LSCR 10 and the primary winding 40 of the transformer when the LSCR is triggered. The auxiliary storage capacitor 42 is connected between the negative terminal of the battery 24 and the junction between a pair of voltage dividing resistors 44 and 46, which are connected in series across the main storage capacitor 22. The auxiliary capacitor 42 is charged by the battery 24 through the limiting resistor 26 and the first one 44 of the voltage dividing resistors. The values of the voltage dividing resistors 44 and 46 are selected so that the voltage across the auxiliary capacitor 42 is limited to a value within the operating range of the LSCR 10.

The LSCR can be used either as a trigger amplifier for the flashlamp 28, or as a self-contained remote triggering device for slave operation of a flashlamp.

For operation responsively to closing of a mechanical switch, such as the synchronizing contacts of a camera shutter or the like, the gate electrode 48 of the LSCR 10 is connected through a manually operable switch 50 and a voltage dividing resistor 52 to one shutter contact 54. The other shutter contact 56 is connected directly to the positive terminal of the main storage capacitor 22, which constitutes a convenient point for grounding the circuit. A voltage limiting resistor 58 is connected between the two contacts or terminals 54 and 56. In this mode of operation, the gate electrode 48 of the LSCR is also connected through the switch 50 and a relatively low value resistor 60 to the negative terminal of the battery.

The resistors 60, 52, and 58 form a voltage-dividing network across the main capacitor 22. Preferably, the resistor 52 is several times as great in value as the resistor 58 so that only a relatively small portion of the supply voltage appears across the camera shutter contacts 54, 56, thereby limiting the load on them. An RC series network including a resistor 62 and a capacitor 64, called the trigger capacitor, is connected directly across the dividing resistor 52. Prior to the closing of the shutter contacts, the trigger capacitor 64 is charged to the voltage across the high value, dividing resistor 52. When the shutter contacts close, they effectively short out the second dividing resistor 58, thereby producing a sudden current surge through capacitor 64 with a corresponding increase in the voltage across the dividing resistor 60 sufficient to trigger the LSCR 10. The auxiliary capacitor 42 then discharges through the primary winding 40 of the transformer and the cathode-anode circuit of the LSCR 10 to produce a high voltage pulse on the flash tube trigger electrode 66, which is connected to the high voltage end of the secondary winding 68 of the transformer. This pulse renders the flash tube 28 conductive, whereupon the main capacitor 22 discharges through it to produce the flash.

Figure 1:
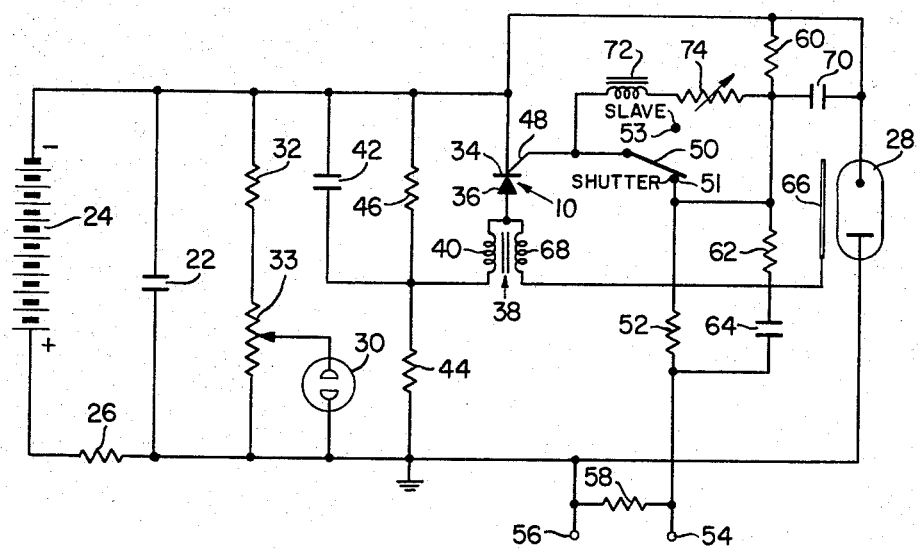
FIG. 1 is a schematic circuit diagram of a trigger circuit constructed according to the presently preferred embodiment of the invention.

With the switch 50 in the shutter position, as shown in FIG. 1, that is, in contact with terminal 51, the shutter input trigger circuit then is from the battery through resistances 60, 52 (in parallel with resistance 62 and capacitance 64), and 58 to ground. Capacitor 64 is charged to 450 volts less the voltage across resistor 58 which may be approximately 100 volts. When the shutter contacts 54, 56 are closed, resistor 58 is shorted out which brings capacitor 64 up to 450 volts. This additional voltage or voltage shift, divided through resistors 60 and 62, will trigger the LSCR.

To greatly reduce noise sensitivity the resistance of resistor 60 is made very small. Acting together with resistor 62, the low value resistances form a pulse voltage divider to provide adequate gate current for anode latching.

Capacitor 64 provides a short rise time, single trigger pulse upon shutter contact closure. LSCR triggering occurs during the resistor 62-capacitor 64 time interval (say, seven milliseconds), and will not occur again until the shutter contacts are opened and closed again for the next flash.

In the event the shutter contacts remain closed, as might occur with certain shutters or other triggering devices, the circuit will not fire repetitively, because the trigger capacitor 64 provides only a very short current pulse. The capacitor 64 is discharged through resistors 52 and 62 after each flash; and this capacitor charges gradually along with the main capacitor 22 and the auxiliary capacitor 42 to prevent an increase of the voltage across the resistor 60 sufficient to trigger the LSCR 10. The circuit remains disabled until the shutter contacts or other external switch opens, because the potential of the gate electrode 48 cannot rise to the firing point in the absence of the pulse produced as hereinabove described by shorting of the resistor 58.

If an operator were inadvertently to touch the shutter terminals 54 and 56, the current pulse through his body would be too short to cause any shock sensation. Resistor 58 serves to lower the shutter terminal voltage, thus reducing the current from capacitor 64 on random noise pulses and additionally reducing the shock hazard and shutter contact wave by lowering the terminal voltage.

It is impossible to light trigger the unit with the mode switch 50 in the shutter position shown due to the extremely low resistance of the gate circuit. The light sensitivity of the LSCR 10 is a function of the impedance between the gate electrode 48 and the cathode 34; and the light sensitivity increases with increasing gate-cathode resistance. When the switch 50 is in shutter position, it connects the low value resistor 60 directly between the gate 48 and the cathode 34, thus making the LSCR insensitive to light and responsive only to the making of a direct, low resistance connection between the terminals 54 and 56.

For so-called remote, or slave operation, that is, for firing a flashlamp at a distance from the main flashlamp, the circuit shown in FIG. 1 may be employed but the switch 50 will be opened, that is, is moved out of contact with terminal 51 and into engagement with stop 53. Thus the flashlamp 28 can be fired in response to an increase of the intensity of light striking the LSCR 10. This shift of switch 50 removes the regular triggering circuit from the LSCR, and places a choke or inductance 72 and a variable resistor or potentiometer 74 in series with the dividing resistor 60 in the circuit between the gate electrode 48 and the cathode 34 of the LSCR. An inductance having a relatively low D.C. resistance is thus switched into the gate circuit. This inductance 72 makes the LSCR sensitive only to a rapid change in light level but insensitive to ambient light conditions. Thus, the unit may be used under much higher ambient light levels than would otherwise be the case. This inductance yields a very high instantaneous impedance making the gate-to-cathode circuit much more sensitive for slave operation than otherwise possible.

The variable resistor or potentiometer 74 is ordinarily adjusted during assembly and factory testing of the circuit to compensate for variations in the operating characteristics of different LSCR's, thereby allowing the use of relatively less expensive, nonselected LSCR devices.

Due to the shorting action of mode switch 50, the circuit will not inadvertently trigger during the transition period. With the mode switch 50 in contact at 53, the circut will not trigger from shutter contacts because the inductance 72 in series with the shunt gate-cathode capacitance filters out the trigger pulse.

During times when the switch 50 is open, the choke 72 and a by-pass capacitor 70, which is connected directly across the dividing resistor 60, act to protect the LSCR from being fired by random electrical noise, or responsively to closure of mechanical contacts that may still be connected across the terminals 54 and 56 even though only light responsive operation is desired.

In an actual embodiment of the circuit, which has been built and successfully tested, the nominal values of the various circuit components were: battery voltage 450 volts; the limiting resistor 26 1000 ohms; the main capacitor 22 500μfd.; the ready light 30 neon type NE-2; the voltage divider network comprising resistors 32–33 1.2 megohm and 1 megohm, respectively; the voltage dividing resistor 44 2.2 megohm; the voltage dividing resistor 46 1.2 megohm; the auxiliary capacitor 42 .25 μfd.; the turns ratio of the transformer 38 1 to 50; the dividing resistor 58 1.2 megohm; the voltage dividing resistor 52 4.7 megohm; the trigger capacitor 64 .005 μfd.; the trigger resistor 62 1500 ohms; the resistor 60 27 ohms; the shunt capacitor 70 .02 μfd.; and the inductance or choke 72 50 henries. With this circuit, reliable operation has been achieved in the remote mode at distances of up to about 50 feet from a main flash tube, and in the contact responsive mode, with contact resistances of up to about 1000 ohms.

From the above it will be seen that an electronic system has been provided that may be used selectively either as a trigger amplifier in a circuit for triggering a flashlamp upon closing of shutter contacts, or as a light-triggerable circuit for slave operation of a flashlamp remotely positioned with respect to the main flashlamp and designed to be operated by the light produced by firing of the main flashlamp. For standardization and minimum production cost, the system can be built into a lamphead to be energized from either a self-contained power pack or battery encased in the supporting tube for the flashlamp, or from an auxiliary, "shoulder" power pack. Then the mode of operation of the system, either as a trigger amplifier or as a remotely triggered slave circuit can be selected simply by shifting a switch 50 in the lamphead.

A flash unit incorporating the system of this invention is shown more or less diagrammatically in FIG. 2. Here 80 denotes a case within which the battery or power pack may be supported and within which parts also of the circuit may also be contained. The case has a gimbal 82 mounted on it at its top, which carries a reflector 84 for the flashlamp 28. The case may be used as a handle to hold the flashlamp near the camera, or it may be attached by a conventional bracket to the camera. Preferably mounted in the same socket as the flashlamp 28 and back of the same is the LSCR 10. Flashlamp 28 and LSCR are connected in the circuit as in FIG. 1. A transparent covering 86 may be mounted in the reflector behind the LSCR to protect it. 88 denotes the leads from the circuitry in the case to the LSCR.

When the flash unit is to be used as a trigger amplifier, it may be connected to the shutter of the camera for synchronized operation of the shutter and flashlamp by plugging the line from the shutter contacts into the socket terminal 54, 56 provided on the side of the case. The switch 50 is then in the position shown in FIG. 1.

When the flash unit is to be used as a remotely triggered light-sensitive flash, the flash unit is held or mounted at the desired distance from the camera and the main flash unit and turned so that the LSCR is directed toward the subject being photographed; the shutter is disconnected from the flash unit; and the switch 50 is moved to the slave position. When the "main" or camera flash is initiated, then, the slave flash will automatically trigger from reflected light. This method of triggering the slave unit is usable only at limited distances from the camera, distances such as may be encountered, for instance, in studio or home photography.

Figure 3:
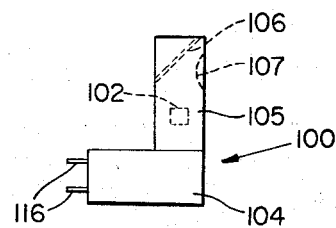
FIG. 3 is a side elevational view of an auxiliary device for increasing the light-sensitivity of the circuit.
Figure 4:
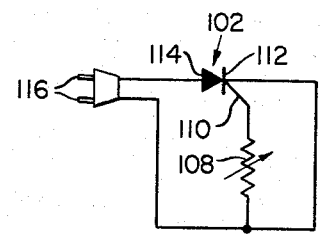
FIG. 4 is a schematic circuit diagram of the auxiliary device.

To extend the distance of usability between the slave flash and the main flash, the auxiliary unit shown in FIGS. 3 and 4 may be employed. This will permit the slave unit to be operated at distances up to 75 or 100 feet from the camera depending upon ambient light conditions. The device 100 is intended to be plugged into the shutter receptacle 54, 56 on the side of the lamphead which is to be used as the slave unit. The unit 100 includes an auxiliary LSCR 102 and a variable resistor 108, which is connected between the gate electrode 110 of the auxiliary LSCR and its cathode 112. The main electrodes 112 and 114 of the LSCR are connected directly to the plug 116 of the unit, which is plugged into the terminals 54, 56 of the slave flash unit. The resistor 108 and the circuitry of the auxiliary unit are encased in a compact, lightweight housing 104. A tube 105 is mounted on this housing for rotatable adjustment thereon. Mounted in the tube is a lens 107 and a mirror 106 for reflecting light from the triggering, or main flash unit down through tube 105 onto the auxiliary LSCR 102 which is also mounted in the tube. The mirror is mounted at an angle of 45° in the tube and its reflecting surface is directed downward. Sensitivity of the unit 100 is controlled by the resistor 108.

For use, the auxiliary device 100 is simply plugged into the receptacle 54, 56 of the side of the lamphead 80 which is to be operated as the slave unit, and the tube 105 is rotated so that the LSCR 102 is directed via the lens 107 and mirror 106 toward the main flash. The mode switch 50 on the slave unit must be in closed or "shutter" position with this set up. When main flashlamp at the camera fires, then, the LSCR 102 in the auxiliary unit will also fire in response to the flash of light of the main lamphead.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. An electrical circuit for operating a photographic flashlamp comprising
    (a) a light sensitive silicon controlled rectifier,
    (b) a storage capacitor,
    (c) a transformer,
    (d) means connecting said capacitor and the primary winding of said transformer in series with the anode and cathode of said rectifier,
    (e) means for charging said capacitor,
    (f) means for biasing said rectifier and maintaining it in a light responsive condition, whereby when a light signal strikes said rectifier it becomes conductive and said capacitor discharges through it and through said primary winding to produce an electrical pulse in the secondary winding of said transformer,
    (g) said biasing and maintaining means including impedance elements connected between the gate electrode and the cathode of said rectifier, said impedance elements being of sufficient value to maintain the sensitivity of said rectifier at a desired level,
    (h) alternatively operable means for reducing the impedance between the gate electrode and cathode of said rectifier to render it substantially insensitive to light, and
    (i) means for applying an electrical trigger pulse between the gate electrode and the cathode of said rectifier in response to closing of an external switch during times when said alternatively operable means is operative.

2. An electrical circuit for operating a photographic flashlamp comprising
    (a) a light-sensitive silicon controlled rectifier,
    (b) a first capacitor,
    (c) a transformer,
    (d) means connecting said capacitor and the primary winding of said transformer in series with the anode and cathode of said rectifier,
    (e) a gaseous flashlamp,
    (f) a trigger electrode for said flashlamp,
    (g) means connecting the secondary winding of said transformer to said trigger electrode,
    (h) a pair of voltage dividing resistors,
    (i) a second capacitor connected in series with one of said pair of voltage dividing resistors,
    (j) a pair of terminals,
    (k) means connecting one of said terminals in series with the other of said voltage dividing resistors,
    (l) means connecting the other terminal with ground,
    (m) means connecting said second capacitor in series with the gate electrode of said rectifier,
    (n) a third capacitor connected in series with said flashtube, and
    (o) a third resistor connected across said terminals and adapted to be shorted out when said terminals are connected, thereby to cause said second capacitor to trigger said rectifier whereby said first capacitor discharges through the primary winding of said transformer and the cathode and anode of said rectifier to cause the secondary winding of said transformer to energize said trigger electrode to render said flashlamp conductive and enable said third capacitor to discharge through said flashlamp.

3. A photographic flashlamp unit comprising
(a) a gaseous flashlamp,
(b) a light-sensitive, solid-state, avalanche device,
(c) means mounting said device in position to receive a light signal,
(d) a capacitor,
(e) means for charging said capacitor to a preselected voltage,
(f) first means for triggering said flashlamp,
(g) means connecting said device to said first triggering means to operate said first triggering means upon triggering of said device,
(h) second means for triggering said device,
(i) separate, third means for preventing operation of said device except upon rapid change of light level, and
(j) a manually-operable switch movable to different positions to select which of said second and third means shall control said device, said capacitor discharging through said flashlamp when said flashlamp has been triggered,
said third means comprising an inductor and a resistor of relatively small value.

4. A photographic flashlamp unit comprising
(a) a gaseous flashlamp,
(b) a light-sensitive, solid-state, avalanche device,
(c) means mounting said device in position to receive a light signal,
(d) a capacitor,
(e) means for charging said capacitor to a preselected voltage,
(f) first means for triggering said flashlamp,
(g) means connecting said device to said first triggering means to operate said first triggering means upon triggering of said device,
(h) second means for triggering said device,
(i) separate, third means for preventing operation of said device except upon rapid change of light level, and
(j) a manually-operable switch movable to different positions to select which of said second and third means shall control said device, said capacitor discharging through said flashlamp when said flashlamp has been triggered, said second triggering means comprising
(k) a second capacitor and a resistor in series therewith,
(l) said second capacitor being connected through a second resistor to said charging means,
(m) means for shorting said second resistor out of the circuit to said second capacitor,
(n) said switch connecting said second capacitor in a first position of said switch in series with the gate of said device,
(o) a transformer,
(p) the anode and cathode of said device being connected in series with the primary winding of said transformer, and
(q) a third capacitor connected in series with said charging means and also in series with said primary winding,
(r) the secondary winding of said transformer being connected with said first triggering means.

5. A photographic flashlamp unit comprising
(a) a gaseous flashlamp,
(b) first triggering means for triggering said flashlamp,
(c) a light-sensitive, solid-state, avalanche device,
(d) means mounting said device in position to receive a light signal,
(e) a first capacitor,
(f) a transformer,
(g) said first capacitor and the primary winding of said transformer being connected in series with each other and with the anode and cathode of said device,
(h) the secondary winding of said transformer being connected with said first triggering means,
(i) a second capacitor,
(j) a third capacitor connected in series with said flashlamp,
(k) charging means for said three capacitors,
(l) a pair of voltage-dividing resistors and a third resistor connecting said second capacitor in series with said charging means,
(m) a switch movable between a first position in which said second capacitor is connected in series with the gate of said device and a second position in which said second capacitor is disconnected from said gate,
(n) a pair of contacts,
(o) means for disconnecting said third resistor from said second capacitor upon closing of said contacts whereby said second capacitor discharges through said gate to trigger said device and cause said first capacitor operating through said secondary winding to trigger said flashlamp to render said flashlamp conductive and enable said third capacitor to discharge through said flashlamp, and
(p) separate means for preventing operation of said device except upon rapid change of light level when said switch is in its second position comprising
(q) an inductance and a resistor in series with said gate.

6. A photographic flashlamp unit comprising
(a) a gaseous flashlamp,
(b) a light-sensitive, solid-state, avalanche device,
(c) means mounting said device in position to receive a light signal,
(d) a capacitor,
(e) means for charging said capacitor to a preselected voltage,
(f) first means for triggering said flashlamp,
(g) means connecting said device to said first triggering means to operate said first triggering means upon triggering of said device,
(h) second means for triggering said device,
(i) separate, third means for preventing operation of said device except upon rapid change of light level, and
(j) a manually-operable switch movable to different positions to select which of said second and third means shall control said device, said capacitor discharging through said flashlamp when said flashlamp has been triggered,
(k) a reflector mounted on said unit,
(l) said flashlamp mounted in front of and in operative relation with said reflector, and
(m) said device being mounted in said reflector behind and coaxial with said flashlamp.

7. A photographic unit as claimed in claim 5, wherein
(a) a reflector is mounted on said unit,
(b) said flashlamp is mounted in front of and in operative relation with said reflector and
(c) said device is mounted in said reflector behind and coaxial with said flashlamp.

8. The combination with a photographic flashlamp unit comprising
(a) a gaseous flashlamp,
(b) a light-sensitive, solid-state, avalanche device,
(c) means mounting said device in position to receive a light signal,
(d) a capacitor,
(e) means for charging said capacitor to a preselected voltage,
(f) first means for triggering said flashlamp,
(g) means connnecting said device to said first triggering means to operate said first triggering means upon triggering of said device,
(h) second means for triggering said device, (i) separate, third means for preventing operation of said device except upon rapid change of light level, and
(j) a manually-operable switch movable to different positions to select which of said second and third means shall control said device, said capacitor discharging through said flashlamp when said flashlamp has been triggered,
(k) said second triggering means including a receptacle having two terminals mounted on said unit, and said unit also including
(l) an auxiliary unit comprising
(m) a second light-sensitive solid-state avalanche device,
(n) a plug receivable in said receptacle for connecting said auxiliary unit to said terminals and thereby in series with said charging means and said one voltage dividing resistor and with said gate when said switch is in its first position,
(o) a variable resistor in series with the gate of said second device,
(p) a tube rotatable in said unit, and
(q) a lens and a mirror mounted in said tube for directing light onto said second light-sensitive resistor.

References Cited by the Examiner
UNITED STATES PATENTS

| | | | |
|---|---|---|---|
| 2,509,005 | 5/1950 | Lord | 315—237 |
| 2,622,229 | 12/1952 | Lord | 315—152 |
| 2,776,364 | 1/1957 | Daniels | 240—1.3 |

JOHN M. HORAN, *Primary Examiner.*